(12) United States Patent
Kussmaul et al.

(10) Patent No.: US 12,470,397 B2
(45) Date of Patent: Nov. 11, 2025

(54) SECURE COMPUTATION OF SHARED DATA INTERSECTIONS

(71) Applicant: SAP SE, Walldorf (DE)

(72) Inventors: Joern Kussmaul, Motzingen (DE); Anselme Tueno, Ettlingen (DE)

(73) Assignee: SAP SE, Walldorf (DE)

( * ) Notice: Subject to any disclaimer, the term of this patent is extended or adjusted under 35 U.S.C. 154(b) by 414 days.

(21) Appl. No.: 18/069,017

(22) Filed: Dec. 20, 2022

(65) Prior Publication Data

US 2024/0205015 A1 Jun. 20, 2024

(51) Int. Cl.
*H04L 9/32* (2006.01)
*G06F 16/22* (2019.01)
*H04L 9/00* (2022.01)

(52) U.S. Cl.
CPC ........ *H04L 9/3239* (2013.01); *G06F 16/2255* (2019.01); *H04L 9/008* (2013.01)

(58) Field of Classification Search
CPC .... H04L 9/3239; H04L 9/008; G06F 16/2255
See application file for complete search history.

(56) References Cited

U.S. PATENT DOCUMENTS

| | | | |
|---|---|---|---|
| 2019/0342270 A1* | 11/2019 | Laine | G06F 21/602 |
| 2021/0336770 A1* | 10/2021 | Ahmed | H04L 9/085 |
| 2023/0359631 A1* | 11/2023 | Badrinarayanan | H04L 9/3239 |

OTHER PUBLICATIONS

Resende et al., "Faster Unbalanced Private Set Intersection", Institute of Computing—University of Campinas (UNICAMP) (Year: 2017).*
Bui et al., "Private Set Intersection from Pseudorandom Correlation", IACR Cryptol. ePrint Arch (Year: 2022).*
Pinkas et al., "Efficient Circuit-Based PSI via Cuckoo Hashing", Advanced in Cryptography—EuroCrypt 2018, pp. 125-157 (Year: 2018).*

* cited by examiner

*Primary Examiner* — Jung W Kim
*Assistant Examiner* — Alan L Kong
(74) *Attorney, Agent, or Firm* — Fountainhead Law Group, PC

(57) ABSTRACT

Mechanisms are disclosed for providing an extended private set intersection nested cuckoo hashing scheme for secure computation of private set intersections. A set of outer hash functions and a set of inner hash functions are exchanged between a server and a client. A server outer hash table is populated using an outer hash function in the set of outer hash functions and the set of server items to create a set of server bins. For each server bin in the server outer hash table, server items to be inserted are iteratively placed into a server inner cuckoo hash table using a plurality of inner hash functions corresponding to each server bin, based on determining that a first corresponding hash table position is free.

17 Claims, 6 Drawing Sheets

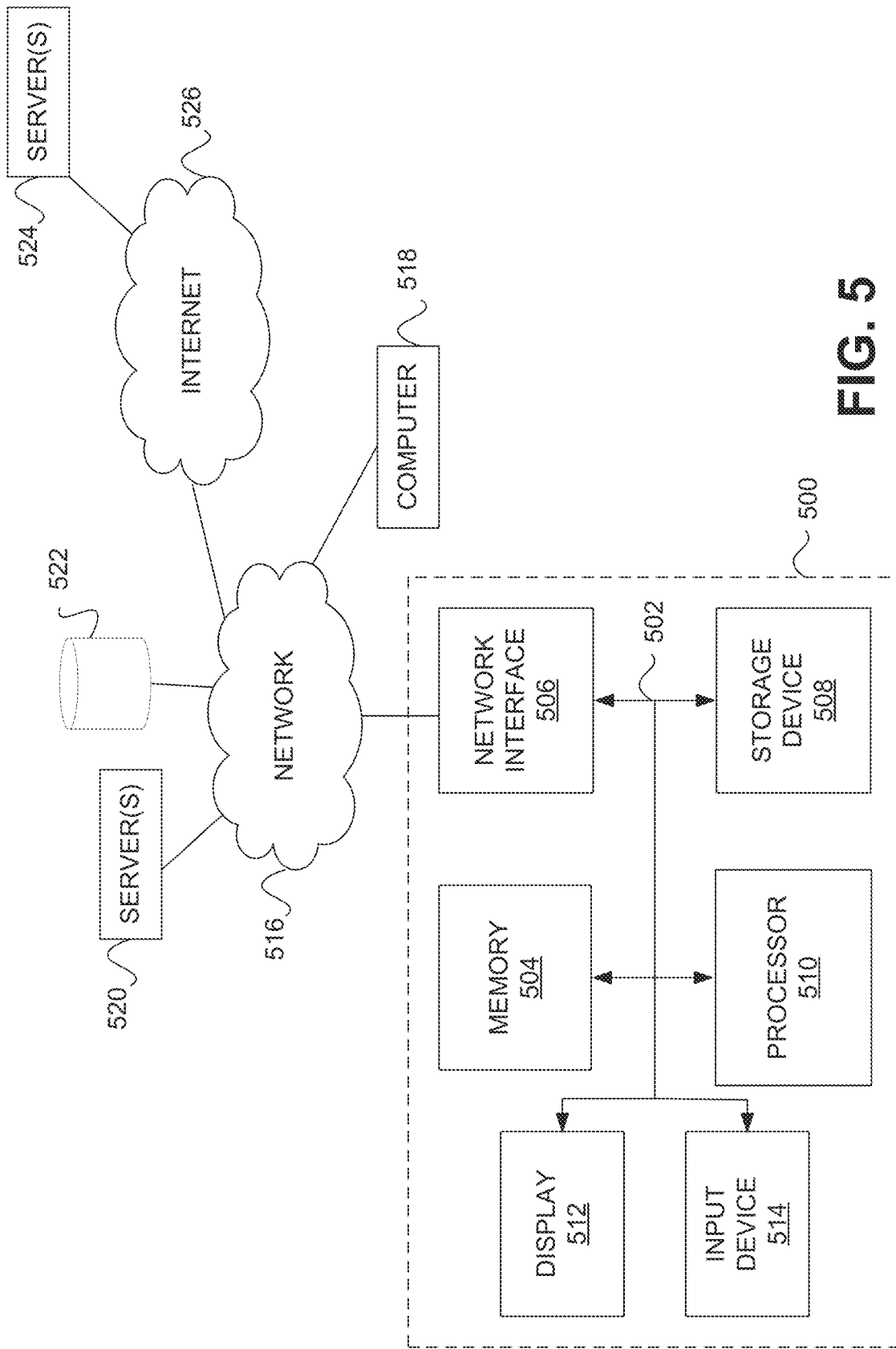

SECURE COMPUTATION OF SHARED DATA INTERSECTIONS

TECHNICAL FIELD

Embodiments generally relate to an improved hashing scheme for calculating a private set intersection, and more particularly to an extended private set intersection nested cuckoo hashing scheme for secure computation of private set intersections.

Calculating the set intersection of two sets of items is a fundamental building block for many real-world use cases. Hash tables are used for large sets to drastically reduce the number of needed comparisons by hashing the items into a hash table. In a multi-party setting where the sets belong to different parties, a question arises how to jointly calculate the intersection of sets without revealing information about one's own set to the other party, the so-called Private Set Intersection (PSI) problem. Hashing can improve the performance of PSI protocols but raises the question of how to avoid leaking too much information, e.g., about how often client items have been placed to which position. PSI protocols come in many different flavors, utilizing different secure building blocks in different use cases and security models.

Given client (e.g., a mobile device) and a server that both have a set of items (e.g., phone numbers or passwords) various approaches may be taken to approach the task of how the client learns which of its items are also part of the (larger) server set without revealing information about the own items to the server. Existing systems may leak information regarding a server's items beyond just the intersection and may be resource intensive and slow. Accordingly, what is needed is an efficient extended private set intersection nested cuckoo hashing scheme for secure computation of private set intersections that overcomes the above-described problems and challenges.

SUMMARY

Disclosed embodiments address the above-mentioned problems by providing one or more non-transitory computer-readable media storing computer-executable instructions that, when executed by a processor, perform a method for facilitating extended private set intersection nested cuckoo hashing scheme for secure computation of private set intersections, the method comprising: exchanging, between a server and a client, a set of outer hash functions and a set of inner hash functions, wherein the set of outer hash functions maps a set of client items to a set of client outer indices, populating a client cuckoo hash table using outer hash functions in the set of outer hash functions, and wherein the set of outer hash functions maps a set of server items to a set of server outer indices, populating a server outer hash table using an outer hash function in the set of outer hash functions and the set of server items to create a set of server bins, and for each server bin in the server outer hash table, iteratively placing server items to be inserted into a server inner cuckoo hash table using a plurality of inner hash functions corresponding to each server bin, based on determining that a first corresponding hash table position is free.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present teachings will be apparent from the following detailed description of the embodiments and the accompanying drawing figures.

BRIEF DESCRIPTION OF THE DRAWING FIGURES

Embodiments are described in detail below with reference to the attached drawing figures, wherein:

FIG. 5 is a diagram illustrating a sample computing device architecture for implementing various aspects described herein.

Figure 1:
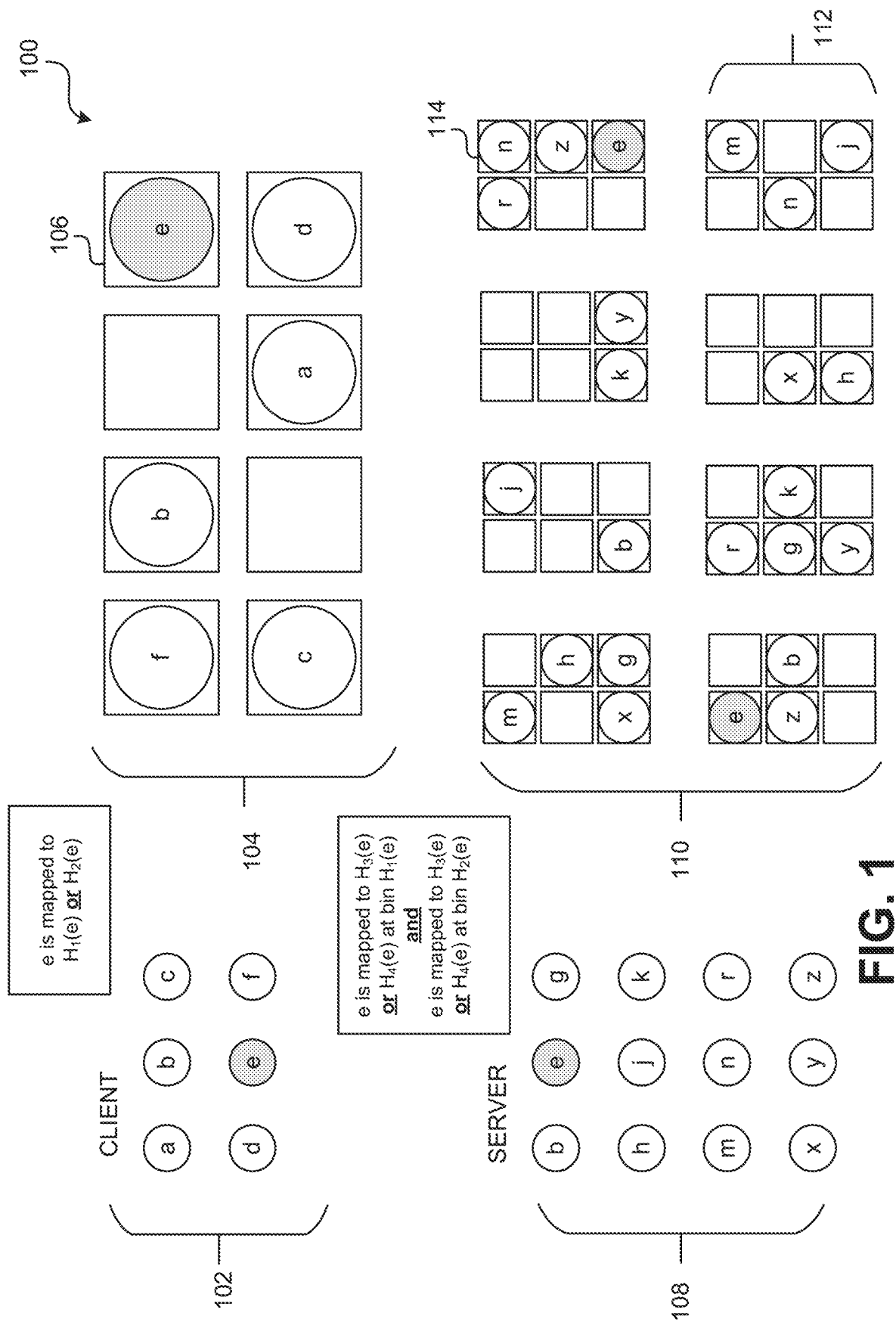
FIG. 1 is a system diagram illustrating client-side cuckoo hashing and server-side nested cuckoo hashing consistent with the present teachings.

The drawing figures do not limit the present teachings to the specific embodiments disclosed and described herein. The drawings are not necessarily to scale, emphasis instead being placed upon clearly illustrating the principles of the disclosure.

DETAILED DESCRIPTION

The subject matter of the present disclosure is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the present claims. Terms should not be interpreted as implying any particular ordering of various steps described unless the order of individual steps is explicitly described.

The following detailed description of embodiments references the accompanying drawings that illustrate specific embodiments in which the present teachings can be practiced. The described embodiments are intended to illustrate aspects of the present teachings in sufficient detail to enable those skilled in the art to practice the present teachings. Other embodiments can be utilized, and changes can be made without departing from the claims. The following detailed description is, therefore, not to be taken in a limiting sense. The scope of embodiments is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Overview

The present teachings describe methods and systems to efficiently provide an extended PSI nested cuckoo hashing scheme for secure computation of private set intersections in an asymmetric use case where set $M_S$ of party S is much larger than set $M_C$ of party C. In this scenario, C (also called client) shall learn $M_C \cap M_S$ and S shall learn nothing. Other PSI protocols make use of specialized hashing approaches (e.g., cuckoo hashing) to decrease the number of needed comparisons while hiding the matching positions from the server. Mechanisms consistent with the present teachings involve nested cuckoo hashing, a novel, optimized hashing approach that reduces the needed item comparisons to a constant factor per item in the client set. Nested cuckoo hashing may be utilized as a generic building block and combined with other building blocks like (additive) homomorphic encryption, oblivious transfer, or function secret sharing. With the help of nested cuckoo hashing, mechanisms consistent with the present teachings can reduce the PSI problem to the problem of securely comparing a client item to a consistent number of many server items without revealing a matching item index. The present teachings disclose secure protocols to efficiently solve this problem.

Terminology and notations are described below that are used to describe the present teachings. Items or elements that are referred to as ρ-bit strings may be also interpreted as ρ-bit unsigned integers. The bit-wise Exclusive Or (XOR) is indicated by $\oplus$ and the bit-wise Negation by ¬. In a secure, two-party computation scenario, one party is called client (denoted by C), the other party is called server (denoted by S). Each party has a finite set of elements which finite set $M_C$ corresponds to a client set and which finite set $M_S$ corresponds to a server set. With $n_S = |M_S|$ and $n_C = |M_C|$, the number of elements in the server set and client set, respectively denoted. For an array A, A[i] denotes the ith entry in A. Depending on the context, an array of length k may be interpreted as k-dimensional vector or (k×l)-dimensional matrix if the array entries are arrays of length l. With $A^T$, the transposition of vector or matrix A is denoted, and with ⟨ , ⟩ the scalar product. For a given natural number i, $H_i$ denotes a hash function. $CT_{H1}, \ldots, _{Hk}$ denotes a cuckoo hash table corresponding to the hash functions $H_1, \ldots, H_k$. $H_1, \ldots, H_k$ may be omitted, simply writing CT if the concrete hash functions are clear in the context. By v←1, assignment of the value of 1 to variable v is denoted. Swapping the values of two variables u, v, such that v contains the previous value of u and vice versa, is denoted by u↔v.

Hash functions calculate a fixed-size fingerprint of a potentially arbitrarily long element. Depending on the usage, different requirements are placed on the hash function. Mechanisms consistent with the present teachings use hash functions to map elements to indices of arrays, also called hash tables. The procedure of placing each item of a set at the calculated hash index in a hash table is denoted as simple hashing. Note that different elements can map to the same index which requires that multiple elements can be placed at the same hash table index in a so-called bin. Previous works have shown that simple hashing a set M to a hash table with |M| possible indices (or bins) leads to expected one item per bin. Hash tables can be used as an efficient data structure for many real-world problems like element lookups. Checking if an element m is part of a set M, placed in a hash table, requires calculating the hash index of m and compare it with each element in the bin at the corresponding index. As such, the worst-case number of needed element comparison is the number of elements in the bin.

To further reduce the needed comparisons per lookup (to a constant number), so-called (basic) cuckoo hashing has been used. Cuckoo hashing makes use of multiple hash functions and thus of multiple possible indices per element. For k different hash functions $H_1, \ldots, H_k$, that map elements to indices, Cuckoo hashing requires that every element is placed at one of the k different indices. In comparison to simple hashing, Cuckoo hashing allows exactly one item per hash table index. The challenge of Cuckoo hashing is to find a placement for the items that meets this requirement. Depending on the use-case, it can be beneficial to use multiple tables per Cuckoo hash table, where each hash function points to a different table, or single-table cuckoo hashing, where all elements are placed in the same table. In some embodiments, both Cuckoo hashing versions may be used, some performance improvements may be achieved by combining single-table and multi-table versions as further described below. Cuckoo hashing can fail. For example, given two hash functions, if three items all have the same two possible hash function indices, cuckoo hashing will not succeed. It can be shown that the probability of successful cuckoo hashing increases rapidly with the hash table size as well as the number of hash functions. However, for many applications, it may be preferable to add a separate list of items, a so-called stash, for storing items that cannot be successfully inserted into a cuckoo hash table.

Operational Environment for Embodiments

FIG. 1 is a system diagram 100 illustrating client-side cuckoo hashing and server-side nested cuckoo hashing consistent with the present teachings. In PSI protocols based on cuckoo hashing a client uses $k_1$ hash functions $H_1, \ldots, H_{k1}$ to hash the client's items into a cuckoo hash table. The server uses the same hash functions to store the server's items in the bins of a simple hash table. By comparison, nested cuckoo hashing scheme consistent with the present teachings involve multiple steps. First, a client uses cuckoo hashing and a server uses simple hashing in connection with a simple hash table. Next, for every bin i in the simple hash table, the server places the items in a cuckoo hash table $CT^i$ corresponding to a different set of $k_2$ hash functions $H_{k1+1}, \ldots, H_{k1+k2}$. The server can use the same $k_2$ hash functions for every bin. The client can now compute for every item m, at index "i," a set of possible second indices $J := \{H_{k1+1}(m), \ldots, H_{k1+k2}(m)\}$.

Under this approach if and only if m is in the intersection, m is placed at index j in the cuckoo hash table $CT^i$ at the server for exactly one j∈J. The size of all hash tables (and the stash) may be configured prior to protocol execution according to shared set sizes of the server and client. A size of the client cuckoo hash table may be designated by $l_1$ and a size of each cuckoo hash table on the server side by $l_2$. To build a secure PSI protocol using cuckoo hashing or nested cuckoo hashing consistent with the present teachings, hashing parameters (i.e., $k_1$, $k_2$ and $l_1$, $l_2$) may be adjusted such that a probability of hashing failures is below a certain threshold (e.g., $2^{-40}$). In some cases, PSI with cuckoo hashing may employ slack factors e such that for $l_1 = \epsilon \cdot n_c$ in order to allow for the probability of client cuckoo hashing failures to be sufficiently small. With nested cuckoo hashing, the server places the items of each simple hashing bin in a cuckoo hash table. As such, $l_2$ may be set to $\epsilon \cdot N_b$, where $N_b$ is an upper bound on the maximum simple hashing bin size. Again, for any fixed values of $l_1$ and $n_S$, an $m_b \in \mathbb{N}$ may be chosen such that $N_b = n_S/l_1 + m_b$ is an upper bound on the maximum simple hashing bin size with sufficiently high probability. Since the server creates $l_1$ cuckoo hash tables, if a constant failure probability per table is assumed, a failure probability of approximately $2^{-40}/l_1$ per table may be employed to achieve an overall nested cuckoo hashing failure probability of $2^{-40}$. However, since the average bin size is just $n_S/l_1$, the average failure probability per nested cuckoo hash table is lower.

As shown in FIG. 1, element "e" may be mapped into a cuckoo hash table by the client. The client has a set of elements denoted set 102. The elements of set 102 may be mapped into cuckoo hash table 104 by way of one or more hash functions, in the example depicted in FIG. 1, $H_1$ and $H_2$. In the illustrated example, element "e" is mapped to position 106 as shown using hash function $H_2$. Similarly, a server may have a set of elements that may be substantially larger in number than the set of elements had by the client. In FIG. 1, these server elements are denoted by set 108. The elements of set 108 may be mapped into nested cuckoo hash table 110 by way of two or more hash functions. In the example depicted in FIG. 1, these functions are $H_1$, $H_2$, $H_3$ and $H_4$. In this example, the server employs bins 112, each of which contains a cuckoo hash table such as cuckoo hash table 114. In this way, the server may use hash function $H_1$ and $H_2$ to identify the bins into which to place an element, such as element "e". From there, hash function $H_3$ or $H_4$ may be used to emplace element "e" at a location within the cuckoo hash table within that bin. As shown in FIG. 1, element "e" is emplaced in the third row of the second column of 114, where the rows and columns are enumerated starting with an index of 1. It is understood that were the rows and columns are enumerated starting with an index of 0, element "e" is emplaced in the row numbered 2 of the column numbered 1.

In some embodiments, a complete set of hash functions are exchanged between client and server upon initialization of a protocol using server-side nested cuckoo hashing consistent with the present teachings. In some such embodiments, the server establishes the sets of hash functions (both the set of outer hash functions as well as the set of inner hash function) and provides the sets of hash functions to the client at initialization.

Figure 2:
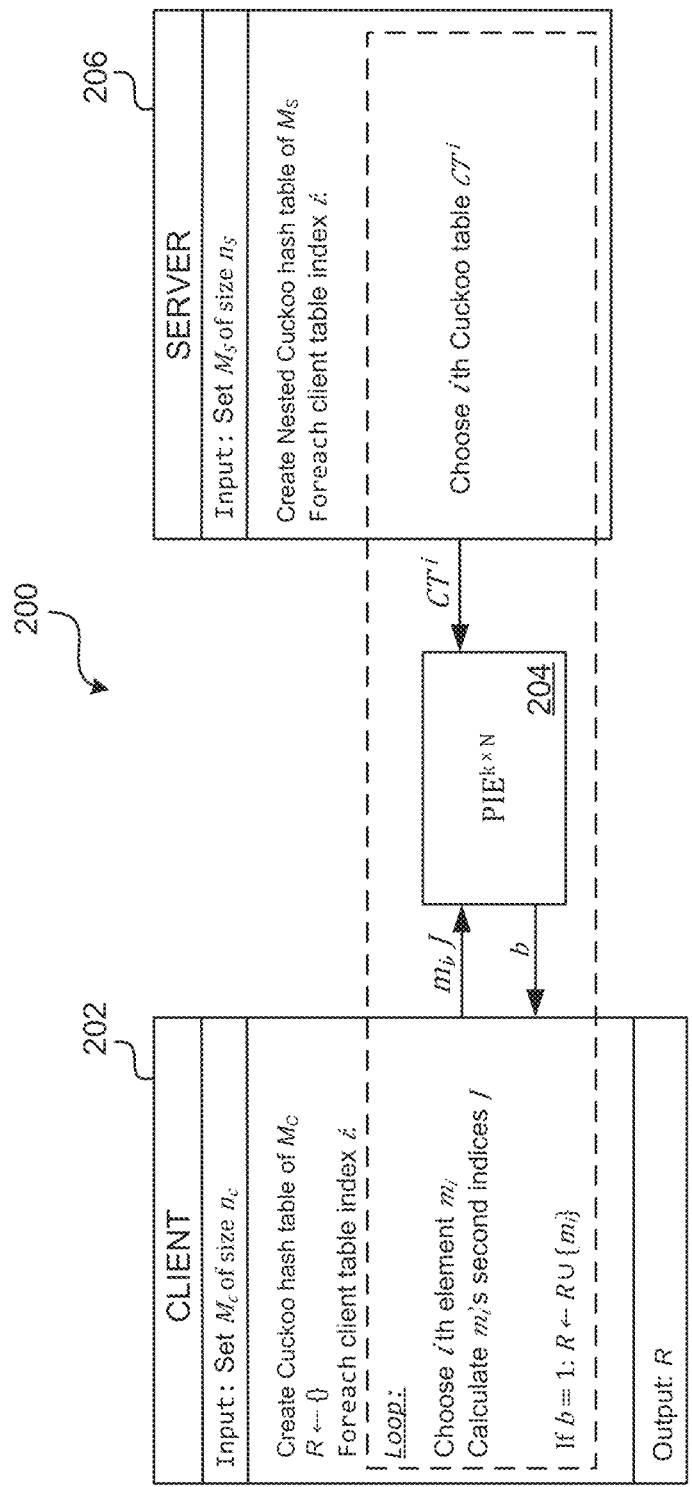
FIG. 2 is a diagram illustrating an example generic PSI protocol using nested cuckoo hashing and private indexed equality (PIE).

FIG. 2 is a diagram 200 illustrating an example generic PSI protocol using nested cuckoo hashing and private indexed equality (PIE) protocol 204. Nested cuckoo hashing schemes consistent with the present teachings enable PSI (or PMT) protocols based on a protocol that securely compares an item with multiple items at given indices. Such an operation may be referred to as private indexed equality (PIE) and may operate in connection with oblivious transfer (OT) mechanisms as well as additive homomorphic encryption (AHE). For given natural numbers k, N, the $\text{PIE}_1^{k \times N}$ protocol is a two-party protocol between a receiver and a sender. The sender inputs an array of N distinct items $(a_1, \ldots, a_N)$. The receiver inputs an index set $J \subseteq 2^{\{1, \ldots, N\}}$ of size k and an item m. As protocol output, the receiver only learns a bit indicating whether the item m is equal to at least one item $a_j$ at any index $j \in J$. Note that the receiver shall not learn the index of a match. By combining nested cuckoo hashing and the PIE protocol 204, it is possible to support efficient and secure PSI protocols as follows. Client 202 uses outer hash functions $H_1, \ldots, H_{k1}$ to place the client's items in a client cuckoo hash table $CT_C$ and initializes an empty set R.

The server 206 uses outer hash functions $H_1, \ldots, H_{k1}$ and inner hash functions $H_{k1+1}, \ldots, H_{k1+k2}$ to place the server's items in a nested cuckoo hash table $(CT^1 s, \ldots, CT^{l1} s)$. For each index i in the client cuckoo hash table, client 202 performs a $\text{PIE}_1^{k2 \times l2}$ protocol with the corresponding item $m := CT_C[i]$ and its second indices $J := \{H_{k1+1}(m), \ldots, H_{k1+k2}(m)\}$, where the server inputs the ith Cuckoo table $CT^i_S$. The PIE protocol 204 outputs to the client whether m is equal to $CT^i_S[j]$ for any $j \in J$. If the PIE protocol 204 outputs True, the client adds m to the set R. After the loop over all Cuckoo hash table indices, the client outputs R.

Figure 3A:
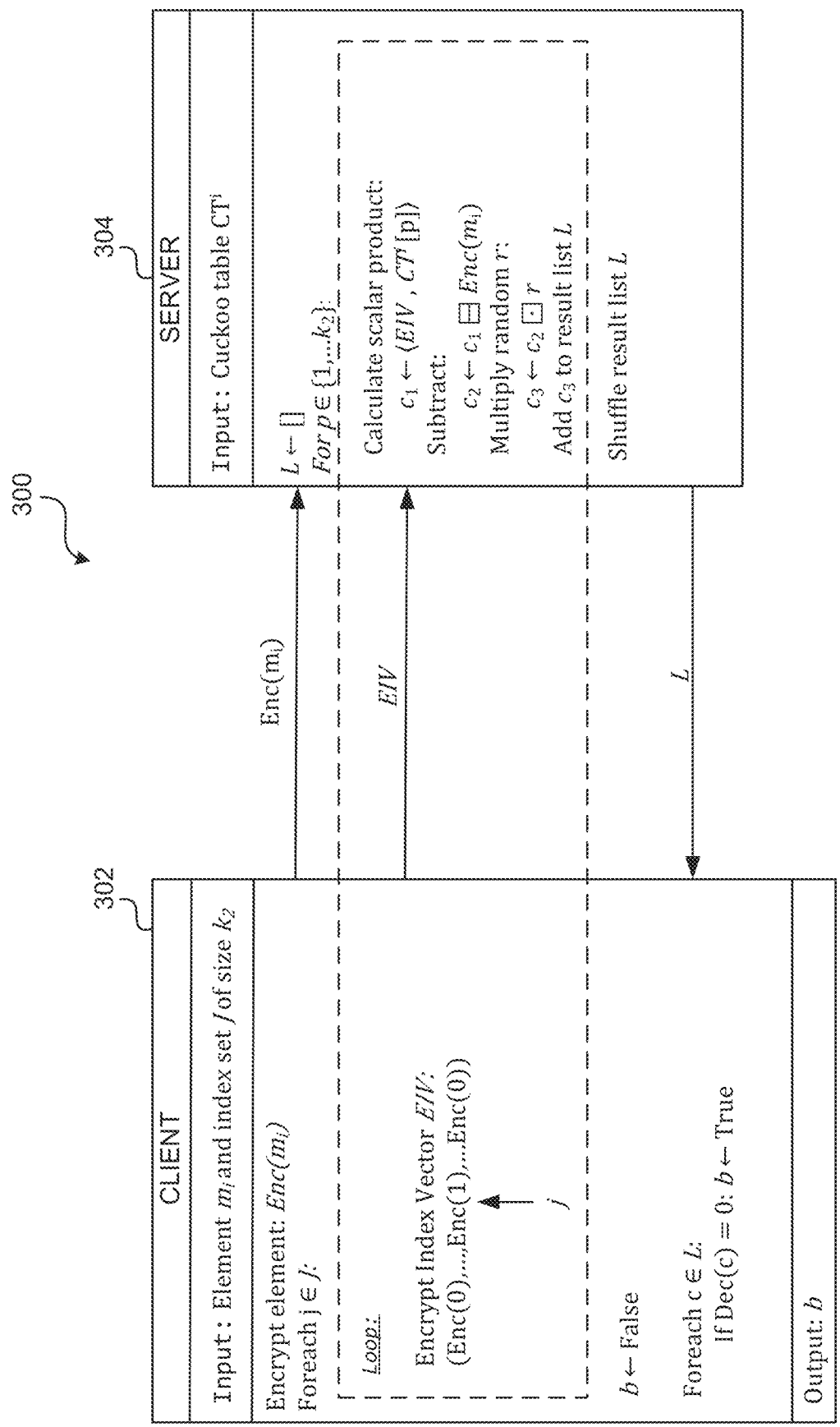
FIG. 3A is a diagram illustrating an example PIE using additive homomorphic encryption (AHE) without stash.

FIG. 3A is a diagram illustrating an example PIE using additive homomorphic encryption (AHE) without stash. In this section, we will present another construction of PIE by using AHE. AHE-based PIE constructions consistent with the present teachings have many possible extensions and variation which, among other things, can reduce the communication cost to a value sublinear in the server set size. An $\text{PIE}_1^{k \times N}$ scheme based on an additive homomorphic encryption $\Pi$ can be constructed as follows. Client 302 first generates a key pair (ksk, kpk) and encrypts m as Enc(m). For all outer indices i, the client 302 creates an N-dimensional encrypted index vector EIV with $EIV_i = \text{Enc}(1)$ and $EIV_j = \text{Enc}(0)$ for all $j \in \{1, \ldots, N\} \setminus \{i\}$. The client sends the public key kpk, the encrypted message Enc(m) and all EIVs to the server. For each EIV, server 304 computes $c_i \leftarrow \langle EIV, A \rangle$, $c_d \leftarrow c_i \boxminus \text{Enc}(m)$ and finally $c_f \leftarrow c_d \boxdot r$ with a random $r \leftarrow \$ M \setminus \{0\}$, where $\boxminus$ and $\boxdot$ denote homomorphic subtraction and multiplication, respectively; and $\langle EIV, A \rangle$ is the scalar product computed homomorphically. All server calculations can be performed using $\Pi$'s plaintext multiplication and homomorphic addition algorithms. Note that $c_i$ is an encryption of the ith server element and $c_d$ is an encryption of the subtraction between m and $a_i$. As such, by multiplying $c_d$ with a random element $r \leftarrow \$ M \setminus \{0\}$, $c_f$ encrypts 0 if $m = a_i$ and a uniformly random element (unequal to 0) otherwise. Before sending back $c_f$ to the client, the server shuffles the $c_f$ for all $j \in J$ such that the client does not learn the index on a match. For security, this construction may be carried out such that the server array consists of pairwise distinct elements and that if $m \neq a_i$ the resulting $c_f$ is indistinguishable from a freshly encrypted random element $r \leftarrow \$ M \setminus \{0\}$.

Figure 3B:
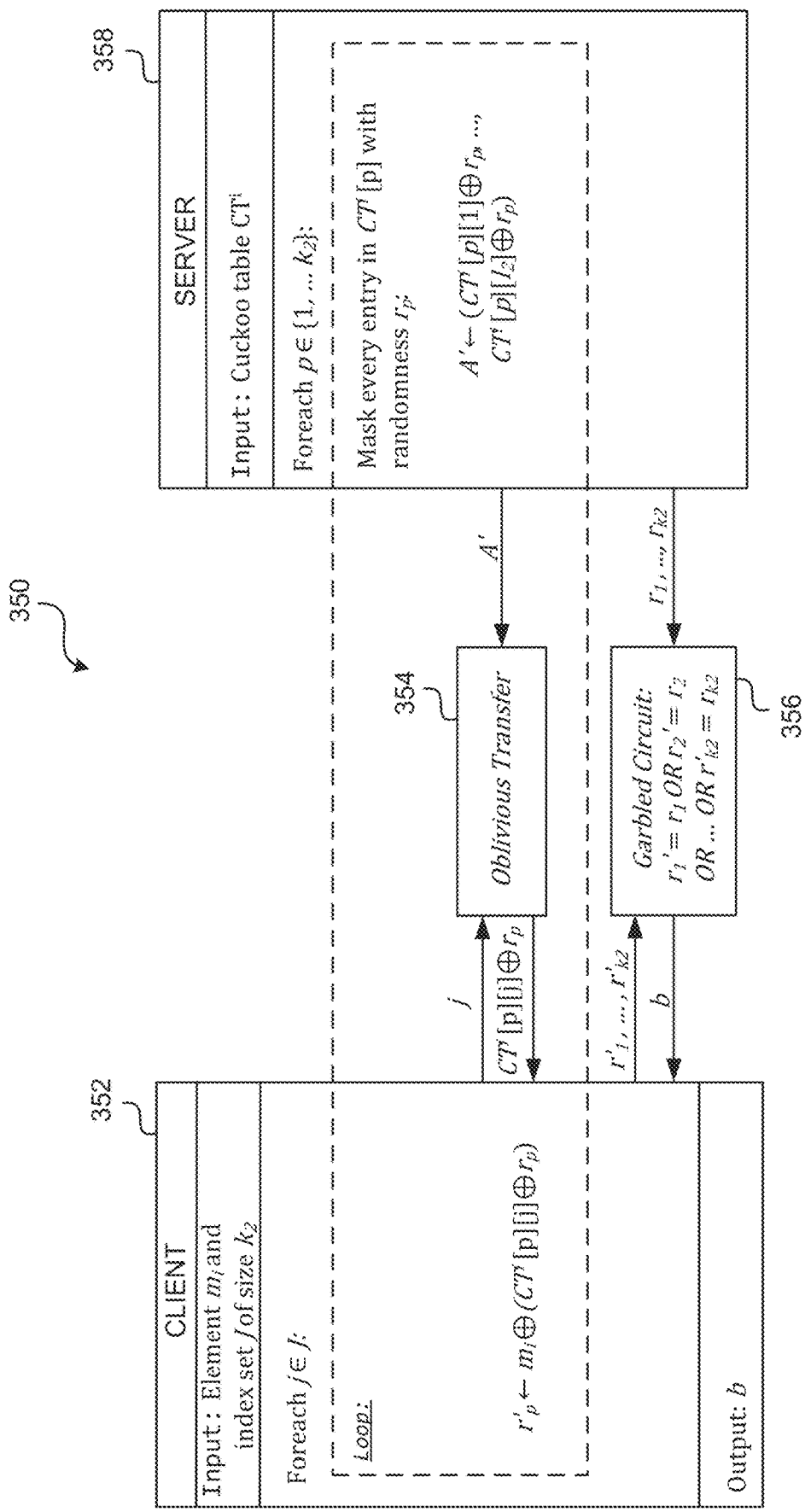
FIG. 3B is a diagram illustrating an example private indexed equality using a 1-out-of-N OT scheme and a garbled circuit consistent with the present teachings.

FIG. 3B is a diagram 350 illustrating an example private indexed equality using a 1-out-of-N oblivious transfer (OT) instance 354 and a garbled circuit consistent 356 with the present teachings. $\text{PIE}_{k \times N}$ protocols can be based on any $OT_1^N$ protocol as follows. For each $j \in J$, client 352 and server 358 perform an $OT_1^N$ instance 354, where the client inputs j and, for all $p \in \{1, \ldots, k\}$, the server uses XOR-masked item inputs, i.e., $a_q \oplus r_p$ with random $r_p$ for all $q \in \{1, \ldots, N\}$. Note, the server 358 does not learn j and uses the same random $r_p$ for all items per $OT_1^N$. The client retrieves $(a_j \oplus r_p)$ and computes $r'_p \leftarrow m \oplus (a_j \oplus r_p)$. Now, the server and the client use an MPC protocol that outputs to the client whether $r_p = r'_p$ for any $p \in \{1, \ldots, k\}$ without revealing p on a match. Note that if any $r_p = r'_p$, then $m = a_j$ and thus the protocol is correct. Since the cardinality $|J| = k$ is small, this step can be efficiently implemented by using generic techniques like garbled circuits. The $\text{PIE}_1^{k \times N}$ based on $OT_1^N$ and a garbled circuit to compare the random masks is illustrated in FIG. 3B. The OT-based PIE protocol with garbled circuits does not require that the server array consists of distinct elements. However, when using PIE-based PSI with nested cuckoo hashing, the items may be distinct.

Figure 4:
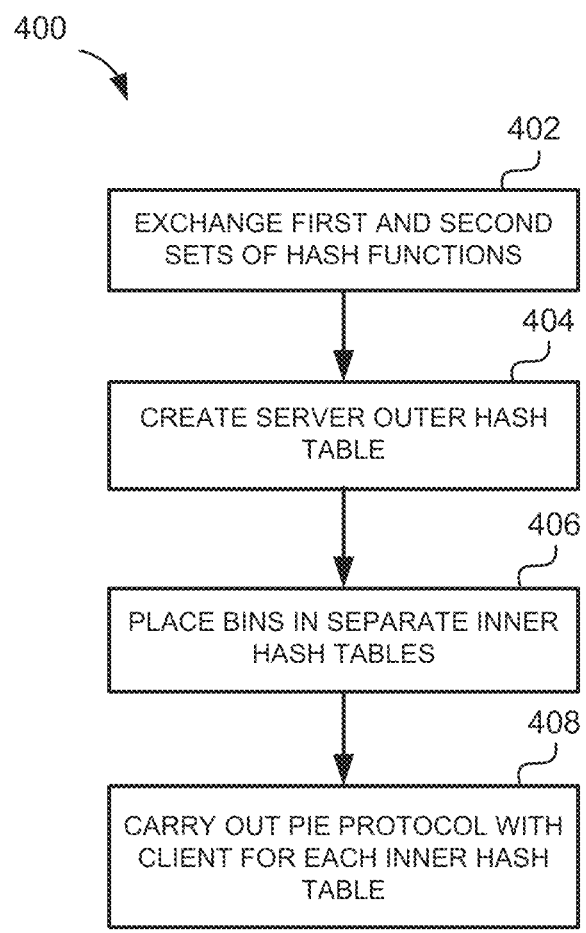
FIG. 4 is a flow diagram illustrating an example method for providing an extended private set intersection nested cuckoo hashing scheme for secure computation of private set intersections according to certain embodiments.

FIG. 4 is a flow diagram 400 illustrating an example method for providing an extended private set intersection nested cuckoo hashing scheme for secure computation of private set intersections according to certain embodiments. At step 402, a set of outer hash functions and a set of inner hash functions are exchanged, between a server and a client, wherein the set of outer hash functions maps a set of client items to a set of client outer indices, and wherein the set of inner hash functions maps a set of server items to a set of server inner indices. At step 404, a server outer hash table is created using an outer hash function in the set of outer hash functions and the set of server items to create a set of server bins.

At step 406, server items to be inserted are iteratively placed into a server inner cuckoo hash table using a plurality of inner hash functions corresponding to each server bin, based on determining that a first corresponding hash table position is free. At step 408, the server carries out a PIE protocol with a client during which time, the client determines which elements the client has in common with the server.

In some embodiments, the method further comprises swapping contents of the second corresponding hash table position with a server item to be inserted, based on determining that a second corresponding hash table position is not free, and based on determining that a configurable number of iterations has been exceeded, the configurable number of iterations associated with the iteratively placing server items, inserting the contents of the second corresponding hash table position into a stash list. In some embodiments, exchanging the set of outer hash functions and the set of inner hash functions is carried out by the server generating the set of outer hash functions and the set of inner hash functions and transmitting the set of outer hash functions and the set of inner hash functions to the client. In some embodiments, each outer index in the set of client outer indices uniquely identifies a location within a client cuckoo hash table and wherein an outer index in the set of outer indices uniquely identifies a location within a server nested cuckoo hash table, the server nested cuckoo hash table comprising the server outer hash table and a set of server inner cuckoo hash tables. In some embodiments, for each outer index, a inner index in the set of inner indices uniquely identifies a location within a cuckoo table inside a server nested cuckoo hash table. In some embodiments, the server outer hash table is a simple hash table. In some embodiments, the server iteratively receives encoded information regarding the set of client items and causes the client to generate a set of elements the client has in common with the server without the server gaining information regarding the set of client items. In some embodiments, the encoded information regarding the set of client items is provided in connection with one of: additive homomorphic encryption and masked oblivious transfer in connection with a garbled circuit.

FIG. 5 is a diagram illustrating a sample computing device architecture for implementing various aspects described herein. Computer 500 can be a desktop computer, a laptop computer, a server computer, a mobile device such as a smartphone or tablet, or any other form factor of general- or special-purpose computing device containing at least one processor that may be employed to cause actions to be carried out. Depicted with computer 500 are several components, for illustrative purposes. Certain components may be arranged differently or be absent. Additional components may also be present. Included in computer 500 is system bus 502, via which other components of computer 500 can communicate with each other. In certain embodiments, there may be multiple busses or components may communicate with each other directly. Connected to system bus 502 is processor 510. Also attached to system bus 502 is memory 504. Also attached to system bus 502 is display 512. In some embodiments, a graphics card providing an input to display 512 may not be a physically separate card, but rather may be integrated into a motherboard or processor 510. The graphics card may have a separate graphics-processing unit (GPU), which can be used for graphics processing or for general purpose computing (GPGPU). The graphics card may contain GPU memory. In some embodiments no display is present, while in others it is integrated into computer 500. Similarly, peripherals such as input device 514 is connected to system bus 502. Like display 512, these peripherals may be integrated into computer 500 or absent. Also connected to system bus 502 is storage device 508, which may be any form of computer-readable media, such as non-transitory computer readable media, and may be internally installed in computer 500 or externally and removably attached.

Computer-readable media include both volatile and non-volatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface 506 is also attached to system bus 502 and allows computer 500 to communicate over a network such as network 516. Network interface 506 can be any form of network interface known in the art, such as Ethernet, ATM, fiber, Bluetooth, or Wi-Fi (i.e., the Institute of Electrical and Electronics Engineers (IEEE) 802.11 family of standards). Network interface 506 connects computer 500 to network 516, which may also include one or more other computers, such as computer 518, server(s) 520, and network storage, such as cloud network storage 522. Network 516 is in turn connected to public Internet 526, which connects many networks globally. In some embodiments, computer 500 can itself be directly connected to public Internet 526 as well as one or more server(s) 524.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, memory, and Programmable Logic Devices (PLDs), used to provide machine instructions and/or data to a programmable processor, including a computer-readable medium that receives machine instructions as a computer-readable signal. The term "computer-readable signal" refers to any signal used to provide machine instructions and/or data to a programmable processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, for example as would a processor cache or other random-access memory associated with one or more physical processor cores.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims. Although the invention has been described with reference to the embodiments illustrated in the attached drawing figures, it is noted that equivalents may be employed, and substitutions made herein without departing from the scope of the invention as recited in the claims. The subject matter of the present disclosure is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the present claims. Terms should not be interpreted as implying any particular ordering of various steps described unless the order of individual steps is explicitly described.

The following detailed description of embodiments references the accompanying drawings that illustrate specific embodiments in which the present teachings can be practiced. The described embodiments are intended to illustrate aspects of the disclosed invention in sufficient detail to enable those skilled in the art to practice the invention. Other embodiments can be utilized, and changes can be made without departing from the claimed scope of the invention. The following detailed description is, therefore, not to be taken in a limiting sense. The scope of embodiments is defined only by the appended claims, along with the full scope of equivalents to which such claims are entitled.

Having thus described various embodiments of the invention, what is claimed as new and desired to be protected by Letters Patent includes the following:

1. One or more non-transitory computer-readable media storing computer-executable instructions that, when executed by a processor, perform a method for providing an extended private set intersection nested cuckoo hashing scheme for secure computation of private set intersections, the method comprising:
    exchanging, between a server and a client, a set of outer hash functions and a set of inner hash functions,
    wherein the set of outer hash functions maps a set of client items and a set of server items to a set of client outer indices and server outer indices, respectively, and wherein the set of inner hash functions maps a set of client items and a set of server items to a set of client inner indices and server inner indices, respectively;
    creating a server outer hash table using an outer hash function in the set of hash outer functions and the set of server items to create a set of server bins; and
    for each server bin in the server outer hash table, iteratively placing server items to be inserted into a server inner cuckoo hash table using a plurality of inner hash functions corresponding to each server bin, based on determining that a first corresponding hash table position is free,
    wherein each outer index in the set of client outer indices uniquely identifies a location within a client cuckoo hash table and wherein client outer index in the set of client outer indices uniquely identifies a cuckoo hash table within a server nested cuckoo hash table, the server nested cuckoo hash table comprising the server outer hash table and a set of server inner cuckoo hash tables.

2. The non-transitory computer-readable media of claim 1, wherein the method further comprises:
    based on determining that a second corresponding hash table position is not free, swapping contents of the second corresponding hash table position with a server item to be inserted; and
    based on determining that a configurable number of iterations has been exceeded, the configurable number of iterations associated with the iteratively placing server items, inserting the contents of the second corresponding hash table position into a stash list.

3. The non-transitory computer-readable media of claim 1, wherein exchanging the set of outer hash functions and the set of inner hash functions is carried out by the server generating the set of outer hash functions and the set of inner hash functions and transmitting the set of outer hash functions and the set of inner hash functions to the client.

4. The non-transitory computer-readable media of claim 1, wherein the server outer hash table is a simple hash table.

5. The non-transitory computer-readable media of claim 1, wherein the server iteratively receives encoded information regarding the set of client items and causes the client to generate a set of elements the client has in common with the server without the server gaining information regarding the set of client items.

6. The non-transitory computer-readable media of claim 5, wherein the encoded information regarding the set of client items is provided in connection with one of: additive homomorphic encryption and masked oblivious transfer in connection with a garbled circuit.

7. A method for providing an extended private set intersection nested cuckoo hashing scheme for secure computation of private set intersections, the method comprising:

exchanging, between a server and a client, a set of outer hash functions and a set of inner hash functions, wherein the set of outer hash functions maps a set of client items and a set of server items to a set of client outer indices and server outer indices, respectively, and wherein the set of inner hash functions maps a set of client items and a set of server items to a set of client inner indices and server inner indices, respectively;

creating a server outer hash table using an outer hash function in the set of outer hash functions and the set of server items to create a set of server bins; and for each server bin in the server outer hash table, iteratively placing server items to be inserted into a server inner cuckoo hash table using a plurality of inner hash functions corresponding to each server bin, based on determining that a first corresponding hash table position is free, wherein each outer index in the set of client outer indices uniquely identifies a location within a client cuckoo hash table and wherein client outer index in the set of client outer indices uniquely identifies a cuckoo hash table within a server nested cuckoo hash table, the server nested cuckoo hash table comprising the server outer hash table and a set of server inner cuckoo hash tables.

8. The method of claim 7, further comprising:

based on determining that a second corresponding hash table position is not free, swapping contents of the second corresponding hash table position with a server item to be inserted; and based on determining that a configurable number of iterations has been exceeded, the configurable number of iterations associated with the iteratively placing server items, inserting the contents of the second corresponding hash table position into a stash list.

9. The method of claim 8, wherein exchanging the set of outer hash functions and the set of inner hash functions is carried out by the server generating the set of outer hash functions and the set of inner hash functions and transmitting the set of outer hash functions and the set of inner hash functions to the client.

10. The method of claim 7, wherein the server outer hash table is a simple hash table.

11. The method of claim 9, wherein the server iteratively receives encoded information regarding the set of client items and causes the client to generate a set of elements the client has in common with the server without the server gaining information regarding the set of client items.

12. The method of claim 11, wherein the encoded information regarding the set of client items is provided in connection with one of: additive homomorphic encryption and masked oblivious transfer in connection with a garbled circuit.

13. A system for providing an extended private set intersection nested cuckoo hashing scheme for secure computation of private set intersections, the system comprising:

at least one processor;

and at least one non-transitory memory storing computer executable instructions that when executed by the at least one processor cause the system to carry out actions comprising:

exchanging, between a server and a client, a set of outer hash functions and a set of inner hash functions, wherein the set of outer hash functions maps a set of client items and a set of server items to a set of client outer indices and server outer indices, respectively, and wherein the set of inner hash functions maps a set of client items and a set of server items to a set of client inner indices and server inner indices, respectively;

creating a server outer hash table using an outer hash function in the set of outer hash functions and the set of server items to create a set of server bins; and for each server bin in the server outer hash table, iteratively placing server items to be inserted into a server inner cuckoo hash table using a plurality of inner hash functions corresponding to each server bin, based on determining that a first corresponding hash table position is free, wherein each outer index in the set of client outer indices uniquely identifies a location within a client cuckoo hash table and wherein client outer index in the set of client outer indices uniquely identifies a cuckoo hash table within a server nested cuckoo hash table, the server nested cuckoo hash table comprising the server outer hash table and a set of server inner cuckoo hash tables.

14. The system of claim 13, wherein the actions further comprise:

based on determining that a second corresponding hash table position is not free, swapping contents of the second corresponding hash table position with a server item to be inserted; and based on determining that a configurable number of iterations has been exceeded, the configurable number of iterations associated with the iteratively placing server items, inserting the contents of the second corresponding hash table position into a stash list.

15. The system of claim 13, wherein exchanging the set of outer hash functions and the set of inner hash functions is carried out by the server generating the set of outer hash functions and the set of inner hash functions and transmitting the set of outer hash functions and the set of inner hash functions to the client.

16. The system of claim 13, wherein the server outer hash table is a simple hash table.

17. The system of claim 15, wherein the server iteratively receives encoded information regarding the set of client items and causes the client to generate a set of elements the client has in common with the server without the server gaining information regarding the set of client items.

\* \* \* \* \*